(12) United States Patent
Muñoz De La Torre Alonso et al.

(10) Patent No.: US 12,501,346 B2
(45) Date of Patent: Dec. 16, 2025

(54) CONTROLLING UE-TO-UE COMMUNICATION

(71) Applicant: Telefonaktiebolaget LM Ericsson (publ), Stockholm (SE)

(72) Inventors: Miguel Angel Muñoz De La Torre Alonso, Madrid (ES); Juan-Mario Martin-Sanchez, Madrid (ES); Carlos Jimenez Cordon, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 424 days.

(21) Appl. No.: 18/012,520

(22) PCT Filed: Aug. 26, 2020

(86) PCT No.: PCT/EP2020/073858
§ 371 (c)(1),
(2) Date: Dec. 22, 2022

(87) PCT Pub. No.: WO2022/033709
PCT Pub. Date: Feb. 17, 2022

(65) Prior Publication Data
US 2023/0262583 A1    Aug. 17, 2023

(30) Foreign Application Priority Data
Aug. 12, 2020   (EP) .................................... 20382746

(51) Int. Cl.
*H04W 48/06* (2009.01)
*H04W 8/22* (2009.01)
*H04W 76/14* (2018.01)

(52) U.S. Cl.
CPC .............. *H04W 48/06* (2013.01); *H04W 8/22* (2013.01); *H04W 76/14* (2018.02)

(58) Field of Classification Search
CPC ....... H04W 48/06; H04W 8/22; H04W 76/14; H04W 76/18; H04W 12/088; H04L 61/5061; H04L 63/0236
See application file for complete search history.

(56) References Cited

U.S. PATENT DOCUMENTS

2018/0103010 A1*  4/2018  Diaz Cuellar ........ H04L 63/166
2020/0112544 A1   4/2020  Smith
2022/0377820 A1* 11/2022  Isomäki ................ H04L 67/142

OTHER PUBLICATIONS

Nokia, "Vertical_LAN 5GLAN related CR for non-FASMO corrections", Change Request, SA WG2 Meeting #137E, Elbonia, Feb. 24, 2020, pp. 1-13, S2-2002557, 3GPP, TSG Doc. No. SP-200076.

(Continued)

*Primary Examiner* — Shawn D Miller
(74) *Attorney, Agent, or Firm* — COATS & BENNETT, PLLC

(57) ABSTRACT

According to an aspect, there is provided a method of operating a session management entity in a communication network. The method comprises sending (901) a first request to a user plane entity in the communication network. The first request relates to UE-to-UE communication and indicates a first set of Internet Protocol, IP, addresses available for allocation to UEs for which UE-to-UE communication is one of blocked or allowed; and at least one subset of the first set of IP addresses for which UE-to-UE communication is the other one of blocked or allowed.

20 Claims, 11 Drawing Sheets

(56) References Cited

OTHER PUBLICATIONS

Nokia et al., '5G-VINNI Solution facility sites High Level Design (HLD)-v1 Norway Facility Site Annex (Release 4)', Report, Jun. 30, 2020, pp. 1-184, Norway.

3rd Generation Partnership Project, "3rd Generation Partnership Project; Technical Specification Group Core Network and Terminals; Interface between the Control Plane and the User Plane Nodes; Stage 3 (Release 16)", Technical Specification, 3GPP TS 29.244 V16.3.1, Apr. 2020, pp. 1-297, 3GPP.

3rd Generation Partnership Project, "3rd Generation Partnership Project; Technical Specification Group Services and System Aspects; Study on enhanced support of Industrial Internet of Things (IIoT) in the 5G System (5GS) (Release 17)", Technical Report, 3GPP TR 23.700-20 V0.4.0, Jun. 2020, pp. 1-58, 3GPP.

Huawei et al., "5GLAN communication discussions", 3GPP TSG-SA WG2 Meeting #130, Kochi, India, Jan. 21-25, 2019, pp. 1-6, S2-1900595, 3GPP.

\* cited by examiner

CONTROLLING UE-TO-UE COMMUNICATION

TECHNICAL FIELD

This disclosure relates to UE-to-UE communication in a communication network, and in particular relates to techniques for blocking or allowing UE-to-UE communication.

BACKGROUND

The 3rd Generation Partnership Project (3GPP) is currently standardising the 5G Core (5GC) network as part of the overall 5G System architecture. Prior to 3GPP Release 15 (Rel-15), the functional distribution within the core network (CN) was based on Network Elements exchanging messages over point to point interfaces. With Rel-15 5G, to facilitate cloud native implementations and deployments, a Service-Based Architecture (SBA) has been introduced, based on the concept of Network Functions (NF) offering and consuming NF Services over Service Based Interfaces (SBIs). FIG. 1 depicts the 5G reference architecture as defined by 3GPP.

Thus FIG. 1 illustrates a 5G system reference architecture 101 showing service-based interfaces used within the Control Plane (CP). It will be appreciated that not all NFs are depicted. Service-based interfaces are represented in the format Nxyz and point to point interfaces in the format Nx. The reference architecture 101 comprises a Network Slice Selection Function (NSSF) 102 that has a Nnssf interface, a Network Exposure Function (NEF) 103 that has a Nnef interface, a NRF 104 that has a Nnrf interface, a Policy Control Function (PCF) 105 that has a Npcf interface, a Unified Data Management (UDM) 106 that has a Nudm interface, an Application Function (AF) 107 that has a Naf interface, an Authentication Server Function (AUF) 108 that has a Nausf interface, an Access and Mobility Management Function (AMF) 109 that has a Namf interface, and a SMF 110 that has a Nsmf interface.

The NRF 104 is a key NF within the 5GC SBA Framework that provides registration and discovery capabilities among the different NFs within the 5GC. In short, when a given NF (e.g. UDM type) registers a NF profile in the NRF 104, other NFs may discover it automatically by simply querying the NRF 104 to find NFs of a given type (e.g. UDM type).

The AMF 109 has an N1 interface to a user equipment (UE) 112, and an N2 interface to an access network (AN) 113 (which can be a radio AN, RAN). The SMF 110 has an N4 interface to a User Plane Function (UPF) 114. The interface between the R(AN) 113 and the UPF 114 is the N3 interface, and the interface between the UPF 114 and a Data Network 115 is the N6 interface.

The relevant architectural aspects for the present disclosure are the PCF 105, the SMF 110 and the UPF 114.

The PCF 105 supports a unified policy framework to govern the network behaviour. Specifically, for the techniques described herein, the PCF provides Policy and Charging Control (PCC) rules to the SMF 110.

The SMF 110 supports different functionality, e.g. session establishment, modify and release, and policy related functionalities like termination of interfaces towards policy control functions, charging data collection, support of charging interfaces and control and coordination of charging data collection at a UPF 114. Specifically, for the techniques described herein, the SMF 110 receives PCC rules from a PCF 105 and configures the UPF 114 accordingly through N4 reference point (a packet flow control protocol (PFCP)) as follows:

The SMF 110 controls the packet processing in the UPF 114 by establishing, modifying or deleting PFCP Sessions and by provisioning (i.e. adding, modifying or deleting) packet detection rules (PDRs), forwarding action rules (FARs), quality of service (QoS) enforcement rules (QERs) and/or usage reporting rules (URRs) per PFCP session, whereby a PFCP session may correspond to an individual protocol data unit (PDU) session or a standalone PFCP session not tied to any PDU session.

Each PDR contains packet detection information (PDI) specifying the traffic filters or signatures against which incoming packets are matched. Each PDR is associated to the following rules providing the set of instructions to apply to packets matching the PDI:

one FAR, which contains instructions related to the processing of the packets, specifically forward, duplicate, drop or buffer the packet with or without notifying the control plane (CP) function about the arrival of a downlink (DL) packet;

zero, one or more QERs, which contains instructions related to the QoS enforcement of the traffic; and zero, one or more URRs, which contains instructions related to traffic measurement and reporting.

The UPF 114 supports the handling of user plane traffic based on the rules received from the SMF 110. Specifically, for the techniques described herein, the UPF 114 supports packet inspection (through PDRs) and different enforcement actions, e.g. access control, traffic steering, QoS, Charging/Reporting (through FARs, QERs and URRs).

UE-to-UE communication, which is also referred to as device-to-device (D2D) communication, refers to the communication between devices, which can be cell phones or vehicles. In the last case, D2D can be referred to as vehicle-to-vehicle (V2V) communication.

An uplink packet originating from a UE device can be destined for one of the following locations:

a packet data network (PDN) accessed through a data network name (DNN), through the N6 interface.

another UE device.

When a UPF 114 receives an uplink packet bound for another UE, the packet does not exit the UPF 114 through N6 interface (so it does not reach the PDN), instead the packet is routed back downlink towards the RAN 113.

The network operator needs to control UE-to-UE communication, such as to prevent or allow the communication of packets between UE devices.

SUMMARY

Network operators may have a requirement to be able to control UE-to-UE communications, specifically to block UE-to-UE communication, e.g. to prevent unsolicited packets from an untrusted UE. The 3GPP standard 3GPP TS 29.244 specifies the PFCP protocol, specifically traffic analysis and classification through PDRs and access control through FARs. However, this has the following problems:

There is no defined mechanism to allow the control of UE-to-UE communication.

The SMF might define a single application identity (appId) to block UE-to-UE communication, but this is not optimal as the configuration of the Internet Protocol (IP) ranges and subranges, which are different for each DNN, will get too complex, particularly in the case of network operators with a large number of DNNs. For example there are some network operators that have hundreds of DNNs. A solution like this would require a large number of matching conditions to handle all the IP ranges and subranges for each DNN. Additionally, this would result in no ease of use from the network operability point of view. For example in case the network operator wants to define an IP subrange to allow UE-to-UE communication for a certain DNN, it will be very difficult to update the configuration with the above solution.

The SMF might also define multiple appIds (one per DNN) to block UE-to-UE communication, but again, this is not optimal as the SMF might need to install in the UPF a very high number of PDRs (twice the number of DNNs), so this solution might require hundreds of extra PDRs, with relevant impacts on signalling at the N4 interface and also on the central processing unit (CPU) processing (and memory) of the UPF, as user plane packets will need to be matched against a very high number of PDRs.

Finally, in case there is any change in the IP address range/subrange assigned to a certain DNN at the SMF (for UE IP address allocation), the UPF will not be updated on such a change, so the UPF will not be able to control UE-to-UE communication.

One or more of the above problems are addressed by the various embodiments presented herein.

According to a first aspect, there is provided a method of operating a session management entity in a communication network. The method comprises sending a first request to a user plane entity in the communication network. The first request relates to UE-to-UE communication and indicates a first set of IP addresses available for allocation to UEs for which UE-to-UE communication is one of blocked or allowed, and at least one subset of the first set of IP addresses for which UE-to-UE communication is the other one of blocked or allowed.

According to a second aspect, there is provided a method of operating a user plane entity in a communication network. The method comprises receiving a first request from a session management entity in the communication network. The first request relates to UE-to-UE communication and indicates a first set of IP addresses available for allocation to UEs for which UE-to-UE communication is one of blocked or allowed, and at least one subset of the first set of IP addresses for which UE-to-UE communication is the other one of blocked or allowed.

According to a third aspect, there is provided a method of operating a policy control entity in a communication network. The method comprises receiving a policy request from a session management entity requesting an indication of a subscriber type for a first wireless device that is to establish a UE-to-UE communication data session, sending a query request to a user data storage entity in the communication network, the query request comprising a subscriber identifier, receiving a query response from the user data storage entity indicating a subscriber type for the first wireless device, and sending a policy response to the session management entity, wherein the policy response indicates a subscriber type for the first wireless device.

According to a fourth aspect, there is provided a method of operating a user data storage entity in a communication network. The method comprises receiving a query request from a policy control entity in the communication network, the query request comprising a subscriber identifier for a first wireless device that is to establish a UE-to-UE communication data session, and sending a query response to the policy control entity indicating a subscriber type for the first wireless device.

According to a fifth aspect, there is provided a computer program product comprising a computer readable medium having computer readable code embodied therein, the computer readable code being configured such that, on execution by a suitable computer or processor, the computer or processor is caused to perform the method of any of the above aspects, or any embodiment thereof.

According to a sixth aspect, there is provided a session management entity for use in a communication network. The session management entity is configured to send a first request to a user plane entity in the communication network. The first request relates to UE-to-UE communication and indicates a first set of IP addresses available for allocation to UEs for which UE-to-UE communication is one of blocked or allowed, and at least one subset of the first set of IP addresses for which UE-to-UE communication is the other one of blocked or allowed.

According to a seventh aspect, there is provided a user plane entity for use in a communication network. The user plane entity is configured to receive a first request from a session management entity in the communication network. The first request relates to UE-to-UE communication and indicates a first set of IP addresses available for allocation to UEs for which UE-to-UE communication is one of blocked or allowed, and at least one subset of the first set of IP addresses for which UE-to-UE communication is the other one of blocked or allowed.

According to an eighth aspect, there is provided a policy control entity for use in a communication network. The policy control entity is configured to receive a policy request from a session management entity requesting an indication of a subscriber type for a first wireless device that is to establish a UE-to-UE communication data session, send a query request to a user data storage entity in the communication network, the query request comprising a subscriber identifier, receive a query response from the user data storage entity indicating a subscriber type for the first wireless device, and send a policy response to the session management entity, wherein the policy response indicates a subscriber type for the first wireless device.

According to a ninth aspect, there is provided a user data storage entity for use in a communication network. The user data storage entity is configured to receive a query request from a policy control entity in the communication network, the query request comprising a subscriber identifier for a first wireless device that is to establish a UE-to-UE communication data session; and send a query response to the policy control entity indicating a subscriber type for the first wireless device.

According to a tenth aspect, there is provided a session management entity for use in a communication network. The session management entity comprises a processor and a memory, said memory containing instructions executable by said processor whereby said session management entity is operative to send a first request to a user plane entity in the communication network. The first request relates to UE-to-UE communication and indicates a first set of IP addresses available for allocation to UEs for which UE-to-UE communication is one of blocked or allowed, and at least one subset of the first set of IP addresses for which UE-to-UE communication is the other one of blocked or allowed.

According to an eleventh aspect, there is provided a user plane entity for use in a communication network. The user plane entity comprises a processor and a memory, said memory containing instructions executable by said processor whereby said user plane entity is operative to receive a first request from a session management entity in the communication network. The first request relates to UE-to-UE communication and indicates a first set of IP addresses available for allocation to UEs for which UE-to-UE communication is one of blocked or allowed; and at least one subset of the first set of IP addresses for which UE-to-UE communication is the other one of blocked or allowed.

According to a twelfth aspect, there is provided a policy control entity for use in a communication network. The policy control entity comprises a processor and a memory, said memory containing instructions executable by said processor whereby said policy control entity is operative to receive a policy request from a session management entity requesting an indication of a subscriber type for a first wireless device that is to establish a UE-to-UE communication data session, send a query request to a user data storage entity in the communication network, the query request comprising a subscriber identifier; receive a query response from the user data storage entity indicating a subscriber type for the first wireless device; and send a policy response to the session management entity, wherein the policy response indicates a subscriber type for the first wireless device.

According to a thirteenth aspect, there is provided a user data storage entity for use in a communication network. The user data storage entity comprises a processor and a memory, said memory containing instructions executable by said processor whereby said user data storage entity is operative to receive a query request from a policy control entity in the communication network, the query request comprising a subscriber identifier for a first wireless device that is to establish a UE-to-UE communication data session, and send a query response to the policy control entity indicating a subscriber type for the first wireless device.

BRIEF DESCRIPTION OF THE DRAWINGS

Some of the embodiments contemplated herein will now be described more fully with reference to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As described further below, the techniques presented herein enable blocking or allowing UE-to-UE communication. In particular embodiments, the packet flow control protocol (PFCP) is extended to efficiently support control of UE-to-UE communication. The control of UE-to-UE communication can be on a per data network/DNN basis and/or on a per IP range basis. The presented techniques can provide one or more of the following benefits or advantages:

The techniques provide a simple and 'easy-to-use' solution which has a minimum impact on the network operator's operability. The configuration of PDRs and appIds as described below can be done automatically, hidden from the customer, and even hidden from the control plane. The configuration of PDRs and appIds as described below also allows optimisation.

The presented techniques can handle UE-to-UE communication based on system capabilities.

The presented techniques can block the UE-to-UE communication to avoid traffic flows in a particular DNN.

The presented techniques enable the network operator to block UE-to-UE communication so as to prevent unsolicited packets from an untrusted UE. It also allows for DNNs and/or IP address sub-ranges to be unblocked (allowed) in an easy way.

Figure 1:
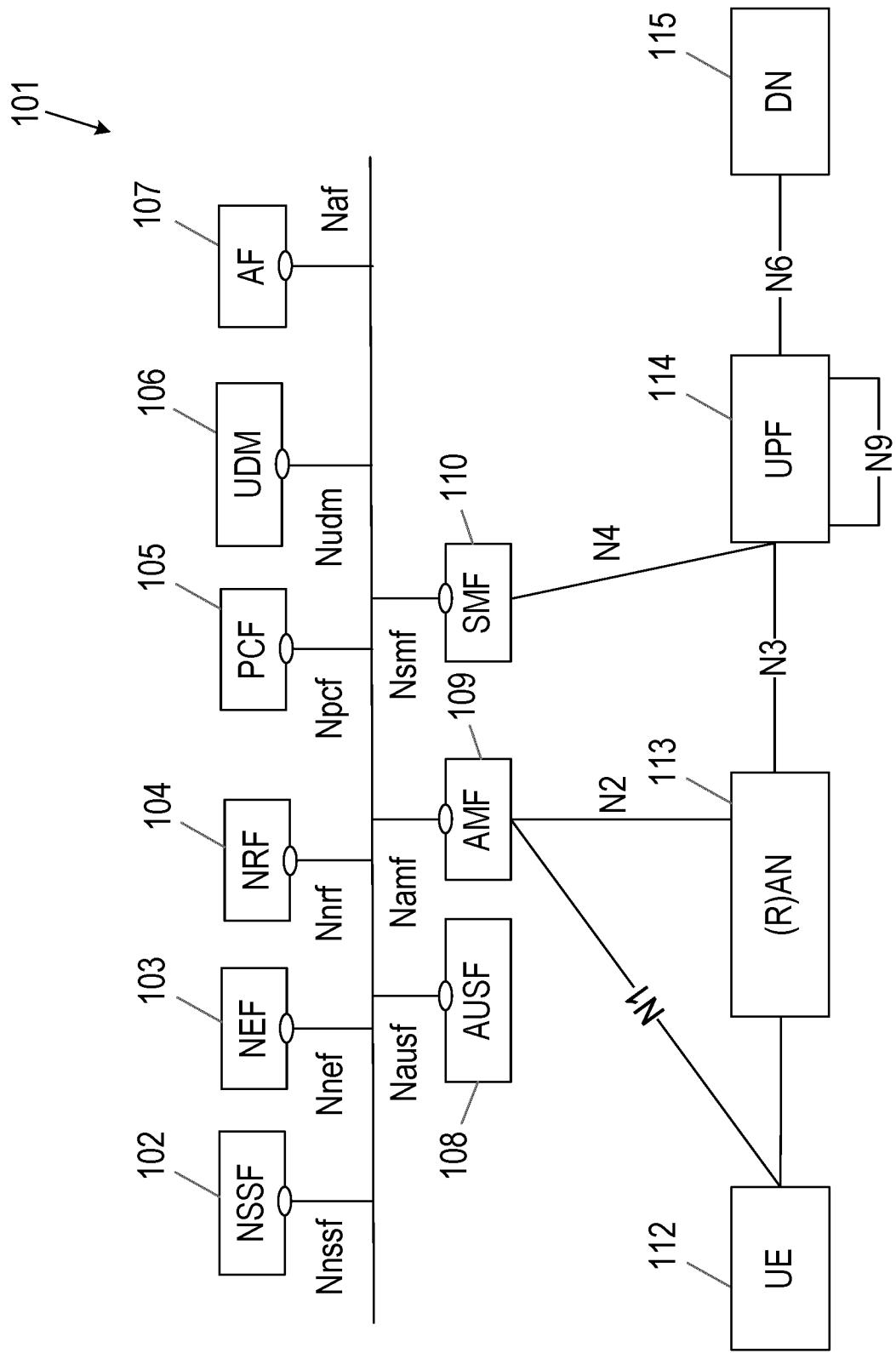
FIG. 1 illustrates a 5G system reference architecture showing service-based interfaces used within the control plane.
Figure 2:
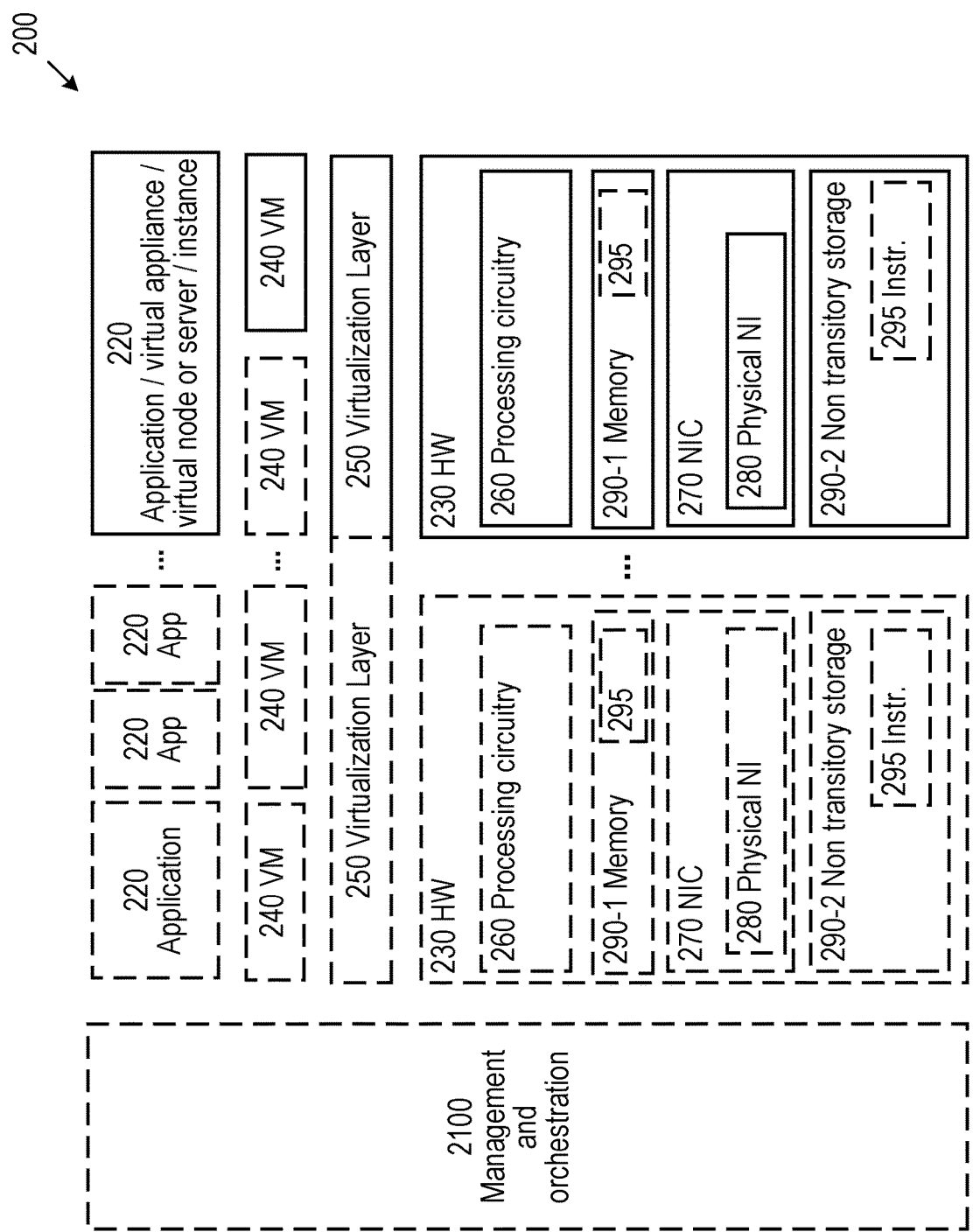
FIG. 2 is a block diagram showing a virtualisation environment that can implement one or more of the entities or functions according to various embodiments.

The presented techniques can be implemented by one or more of a session management entity, a user plane entity, a policy control entity and a user data storage entity. FIG. 2 shows a virtualization apparatus that can be used to implement any one or more of these entities and FIGS. 3-6 show simplified block diagrams of these entities. The signalling diagram in FIG. 7 presents an exemplary embodiment of the techniques described herein implemented in a 5G network. However, it will be appreciated that the techniques can be implemented in a similar way in a 4G (Long Term Evolution (LTE)) network. The embodiment in FIG. 7 is explained with reference to the illustration of two corporate DNNs in FIG. 8.

Thus, FIG. 2 is a schematic block diagram illustrating a virtualization environment 200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node), to a device (e.g., a UE, a wireless device or any other type of communication device), or components thereof, or network functions (e.g. an SMF, a UPF, a PCF, a UDR, etc.) and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 200 hosted by one or more of hardware nodes 230. In further embodiments one or more of the network functions may be entirely virtualized.

The functions may be implemented by one or more applications 220 (which may alternatively be called software instances, virtual appliances, network functions, virtual nodes, virtual network functions, etc.) operative to implement some of the features, functions, and/or benefits of some of the embodiments disclosed herein. Applications 220 are run in virtualization environment 200 which provides hardware 230 comprising processing circuitry 260 and memory 290. Memory 290 contains instructions 295 executable by processing circuitry 260 whereby application 220 is operative to provide one or more of the features, benefits, and/or functions disclosed herein.

Virtualization environment 200, comprises general-purpose or special-purpose network hardware devices 230 comprising a set of one or more processors or processing circuitry 260, which may be commercial off-the-shelf (COTS) processors, dedicated Application Specific Integrated Circuits (ASICs), or any other type of processing circuitry including digital or analog hardware components or special purpose processors. Each hardware device may comprise memory 290-1 which may be non-persistent memory for temporarily storing instructions 295 or software executed by processing circuitry 260. Each hardware device may comprise one or more network interface controllers (NICs) 270, also known as network interface cards, which include physical network interface 280. Each hardware device may also include non-transitory, persistent, machine-readable storage media 290-2 having stored therein software 295 and/or instructions executable by processing circuitry 260. Software 295 may include any type of software including software for instantiating one or more virtualization layers 250 (also referred to as hypervisors), software to execute virtual machines 240 as well as software allowing it to execute functions, features and/or benefits described in relation with some embodiments described herein.

Virtual machines 240 comprise virtual processing, virtual memory, virtual networking or interface and virtual storage, and may be run by a corresponding virtualization layer 250 or hypervisor. Different embodiments of the instance of virtual appliance 220 may be implemented on one or more of virtual machines 240, and the implementations may be made in different ways.

During operation, processing circuitry 260 executes software 295 to instantiate the hypervisor or virtualization layer 250, which may sometimes be referred to as a virtual machine monitor (VMM). Virtualization layer 250 may present a virtual operating platform that appears like networking hardware to virtual machine 240.

As shown in FIG. 2, hardware 230 may be a standalone network node with generic or specific components. Hardware 230 may implement some functions via virtualization. Alternatively, hardware 230 may be part of a larger cluster of hardware (e.g. such as in a data center or customer premise equipment (CPE)) where many hardware nodes work together and are managed via management and orchestration (MANO) 2100, which, among others, oversees life-cycle management of applications 220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 240 may be a software implementation of a physical machine that runs programs as if they were executing on a physical, non-virtualized machine. Each of virtual machines 240, and that part of hardware 230 that executes that virtual machine, be it hardware dedicated to that virtual machine and/or hardware shared by that virtual machine with others of the virtual machines 240, forms a separate virtual network elements (VNE).

Still in the context of NFV, Virtual Network Function (VNF) is responsible for handling specific network functions that run in one or more virtual machines 240 on top of hardware networking infrastructure 230 and corresponds to application 220 in FIG. 2.

Figure 3:
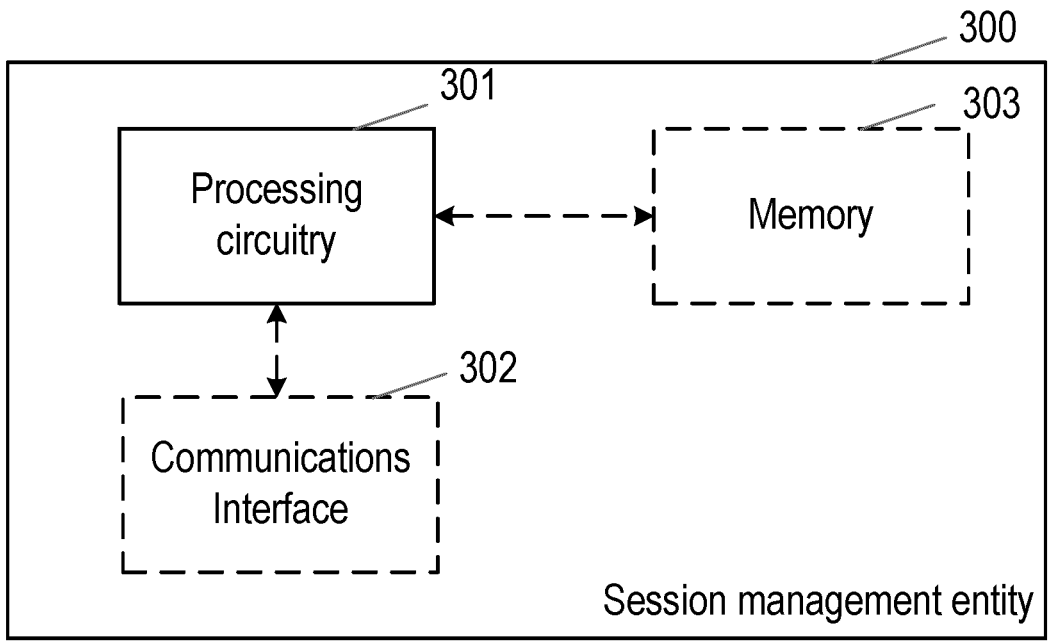
FIG. 3 is a block diagram of a session management entity according to various embodiments.

FIG. 3 illustrates a session management entity 300 comprising processing circuitry (or logic) 301. When implemented in a 5G network, the session management entity 300 can be an SMF. When implemented in a LTE (4G) network, the session management entity 300 can be a PDN Gateway (PGW) Control Plane Function, PGW-C or a Traffic Detection Function Control Plane Function, TDF-C.

It will be appreciated that the session management entity 300 may comprise one or more virtual machines running different software and/or processes. The session management entity 300 may therefore comprise one or more servers, switches and/or storage devices and/or may comprise cloud computing infrastructure that runs the software and/or processes.

The processing circuitry 301 controls the operation of the session management entity 300 and can implement the methods described herein in relation to a session management entity. The processing circuitry 301 can comprise one or more processors, processing units, multi-core processors or modules that are configured or programmed to control the session management entity 300 in the manner described herein. In particular implementations, the processing circuitry 301 can comprise a plurality of software and/or hardware modules that are each configured to perform, or are for performing, individual or multiple steps of the method described herein in relation to the session management entity 300.

In some embodiments, the session management entity 300 may optionally comprise a communications interface 302. The communications interface 302 can be for use in communicating with other nodes, such as other virtual nodes, and for example a user plane entity and/or a policy control entity. The user plane entity may be a UPF in a 5G network or a PGW User Plane Function, PGW-U, or a TDF User Plane Function, TDF-U in a 4G (LTE) network. The policy control entity may be a PCF in a 5G network or a Policy and Charging Rules Function (PCRF) in a 4G (LTE) network.

For example, the communications interface 302 can be configured to transmit to and/or receive from other nodes or network functions requests, resources, information, data, signals, or similar. The processing circuitry 301 may be configured to control the communications interface 302 to transmit to and/or receive from other nodes or network functions requests, resources, information, data, signals, or similar.

Optionally, the session management entity 300 may comprise a memory 303. In some embodiments, the memory 303 can be configured to store program code that can be executed by the processing circuitry 301 to perform the method described herein in relation to the session management entity 300. Alternatively or in addition, the memory 303 can be configured to store any requests, resources, information, data, signals, or similar that are described herein. The processing circuitry 301 may be configured to control the memory 303 to store any requests, resources, information, data, signals, or similar that are described herein.

Figure 4:
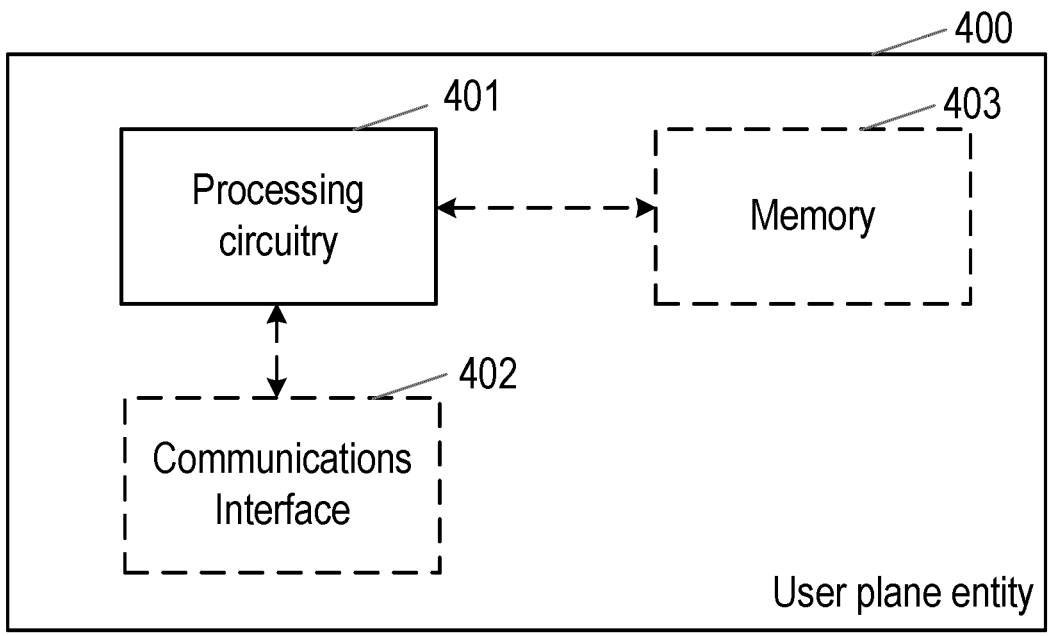
FIG. 4 is a block diagram of a user plane entity according to various embodiments.

FIG. 4 illustrates a user plane entity 400 comprising processing circuitry (or logic) 401. When implemented in a 5G network, the user plane entity 400 can be a UPF. When implemented in a LTE (4G) network, the user plane entity 400 can be a PGW-U or a TDF-U.

It will be appreciated that the user plane entity 400 may comprise one or more virtual machines running different software and/or processes. The user plane entity 400 may therefore comprise one or more servers, switches and/or storage devices and/or may comprise cloud computing infrastructure that runs the software and/or processes.

The processing circuitry 401 controls the operation of the user plane entity 400 and can implement the methods described herein in relation to a user plane entity. The processing circuitry 401 can comprise one or more processors, processing units, multi-core processors or modules that are configured or programmed to control the user plane entity 400 in the manner described herein. In particular implementations, the processing circuitry 401 can comprise a plurality of software and/or hardware modules that are each configured to perform, or are for performing, individual or multiple steps of the method described herein in relation to the user plane entity 400.

In some embodiments, the user plane entity 400 may optionally comprise a communications interface 402. The communications interface 402 can be for use in communicating with other nodes, such as other virtual nodes, and for example a session management entity. The session management entity can be an SMF in a 5G network and a PGW-C or TDF-C in a 4G (LTE) network.

For example, the communications interface 402 can be configured to transmit to and/or receive from other nodes or network functions requests, resources, information, data, signals, or similar. The processing circuitry 401 may be configured to control the communications interface 402 to transmit to and/or receive from other nodes or network functions requests, resources, information, data, signals, or similar.

Optionally, the user plane entity 400 may comprise a memory 403. In some embodiments, the memory 403 can be configured to store program code that can be executed by the processing circuitry 401 to perform the method described herein in relation to the user plane entity 400. Alternatively or in addition, the memory 403 can be configured to store any requests, resources, information, data, signals, or similar that are described herein. The processing circuitry 401 may be configured to control the memory 403 to store any requests, resources, information, data, signals, or similar that are described herein.

Figure 5:
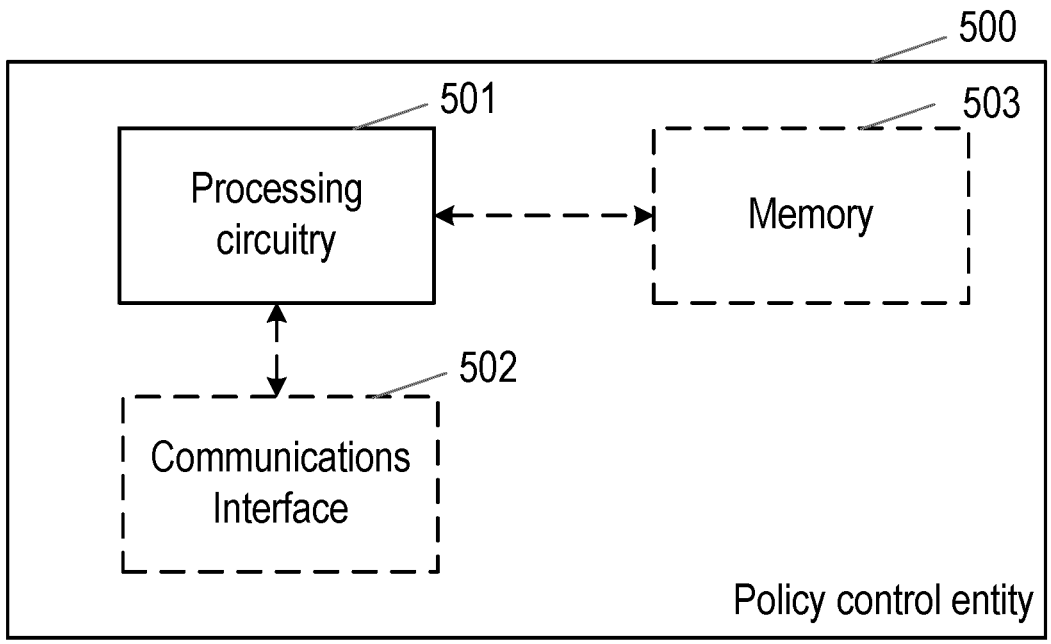
FIG. 5 is a block diagram of a policy control entity according to various embodiments.

FIG. 5 illustrates a policy control entity 500 comprising processing circuitry (or logic) 501. When implemented in a 5G network, the policy control entity 500 can be an PCF. When implemented in a LTE (4G) network, the policy control entity 500 can be a PCRF.

It will be appreciated that the policy control entity 500 may comprise one or more virtual machines running different software and/or processes. The policy control entity 500 may therefore comprise one or more servers, switches and/or storage devices and/or may comprise cloud computing infrastructure that runs the software and/or processes.

The processing circuitry 501 controls the operation of the policy control entity 500 and can implement the methods described herein in relation to a policy control entity. The processing circuitry 501 can comprise one or more processors, processing units, multi-core processors or modules that are configured or programmed to control the policy control entity 500 in the manner described herein. In particular implementations, the processing circuitry 501 can comprise a plurality of software and/or hardware modules that are each configured to perform, or are for performing, individual or multiple steps of the method described herein in relation to the policy control entity 500.

In some embodiments, the policy control entity 500 may optionally comprise a communications interface 502. The communications interface 502 can be for use in communicating with other nodes, such as other virtual nodes, and for example a session management entity and/or a user data storage entity. The session management entity may be an SMF in a 5G network or a PGW-C or a TDF-U in a 4G (LTE) network. The user data storage entity may be a user data repository (UDR) in a 5G network or a Home Subscriber Server (HSS) in a 4G (LTE) network.

For example, the communications interface 502 can be configured to transmit to and/or receive from other nodes or network functions requests, resources, information, data, signals, or similar. The processing circuitry 501 may be configured to control the communications interface 502 to transmit to and/or receive from other nodes or network functions requests, resources, information, data, signals, or similar.

Optionally, the policy control entity 500 may comprise a memory 503. In some embodiments, the memory 503 can be configured to store program code that can be executed by the processing circuitry 501 to perform the method described herein in relation to the policy control entity 500. Alternatively or in addition, the memory 503 can be configured to store any requests, resources, information, data, signals, or similar that are described herein. The processing circuitry 501 may be configured to control the memory 503 to store any requests, resources, information, data, signals, or similar that are described herein.

Figure 6:
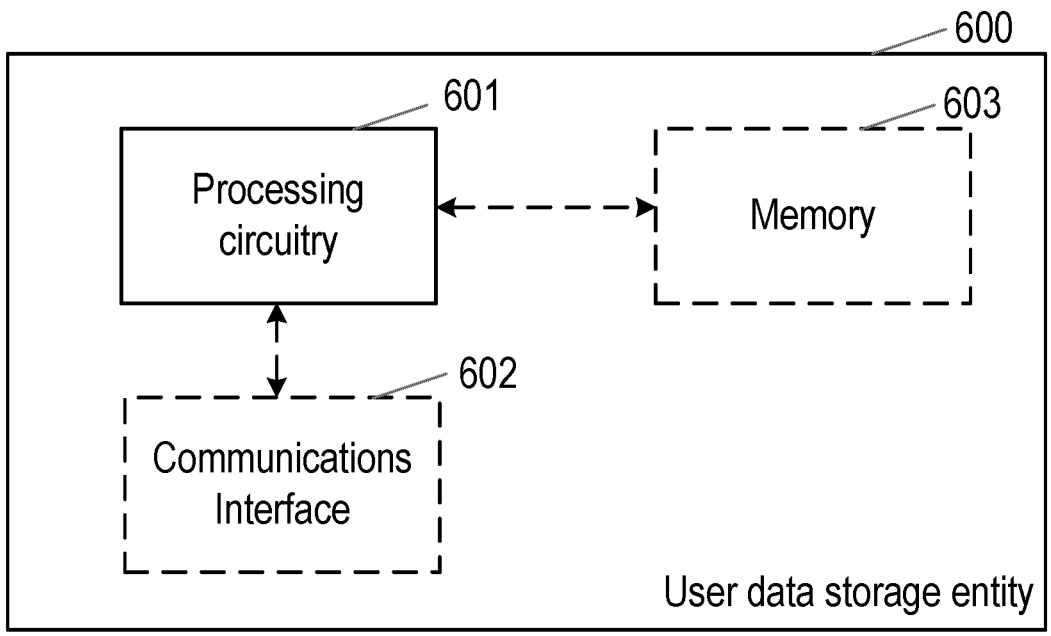
FIG. 6 is a block diagram of a user data storage entity according to various embodiments.
Figure 7A:
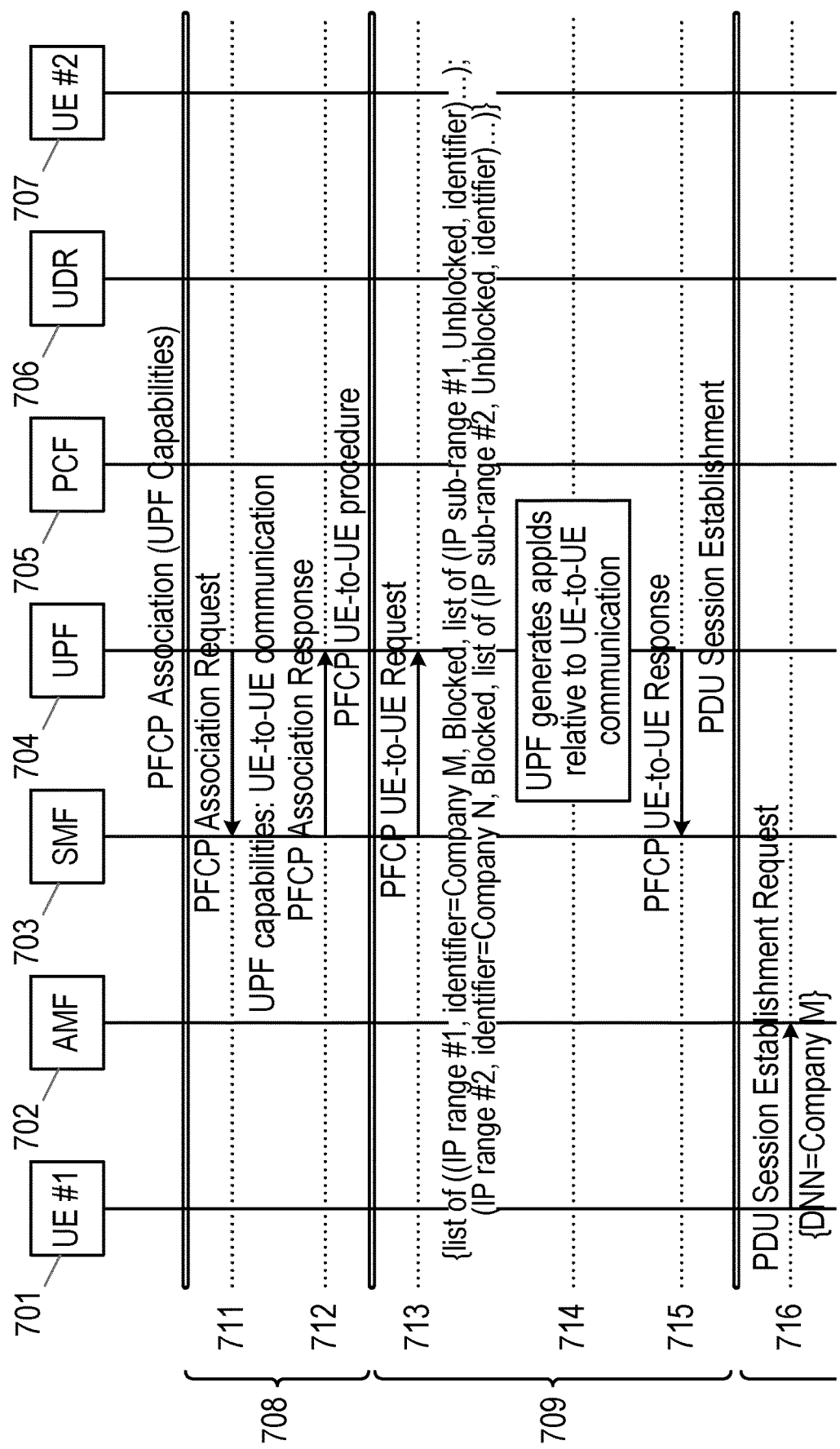
FIG. 7 is a signalling diagram illustrating embodiments of the techniques described herein.
Figure 7B:
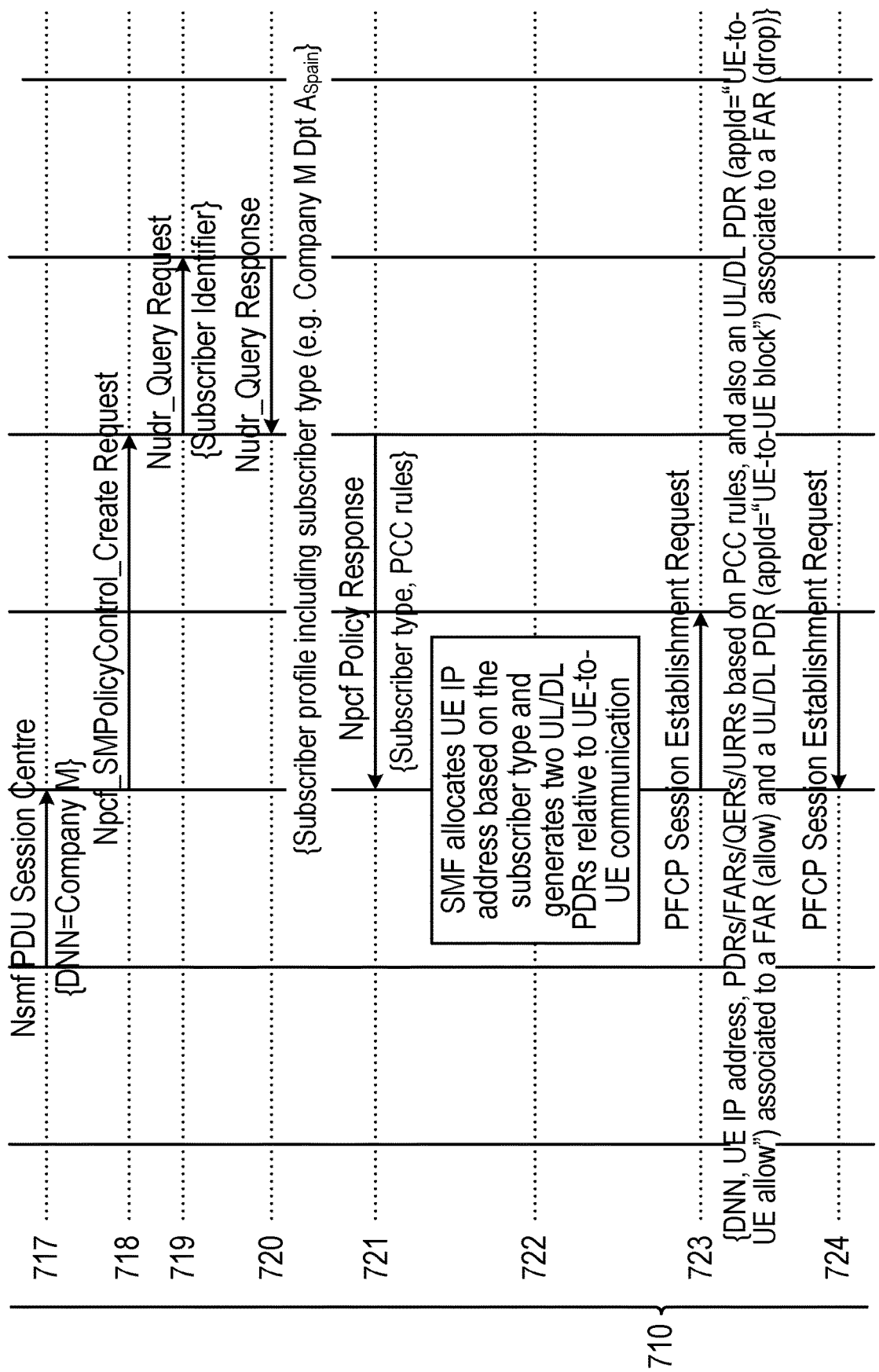
Figure 7C:
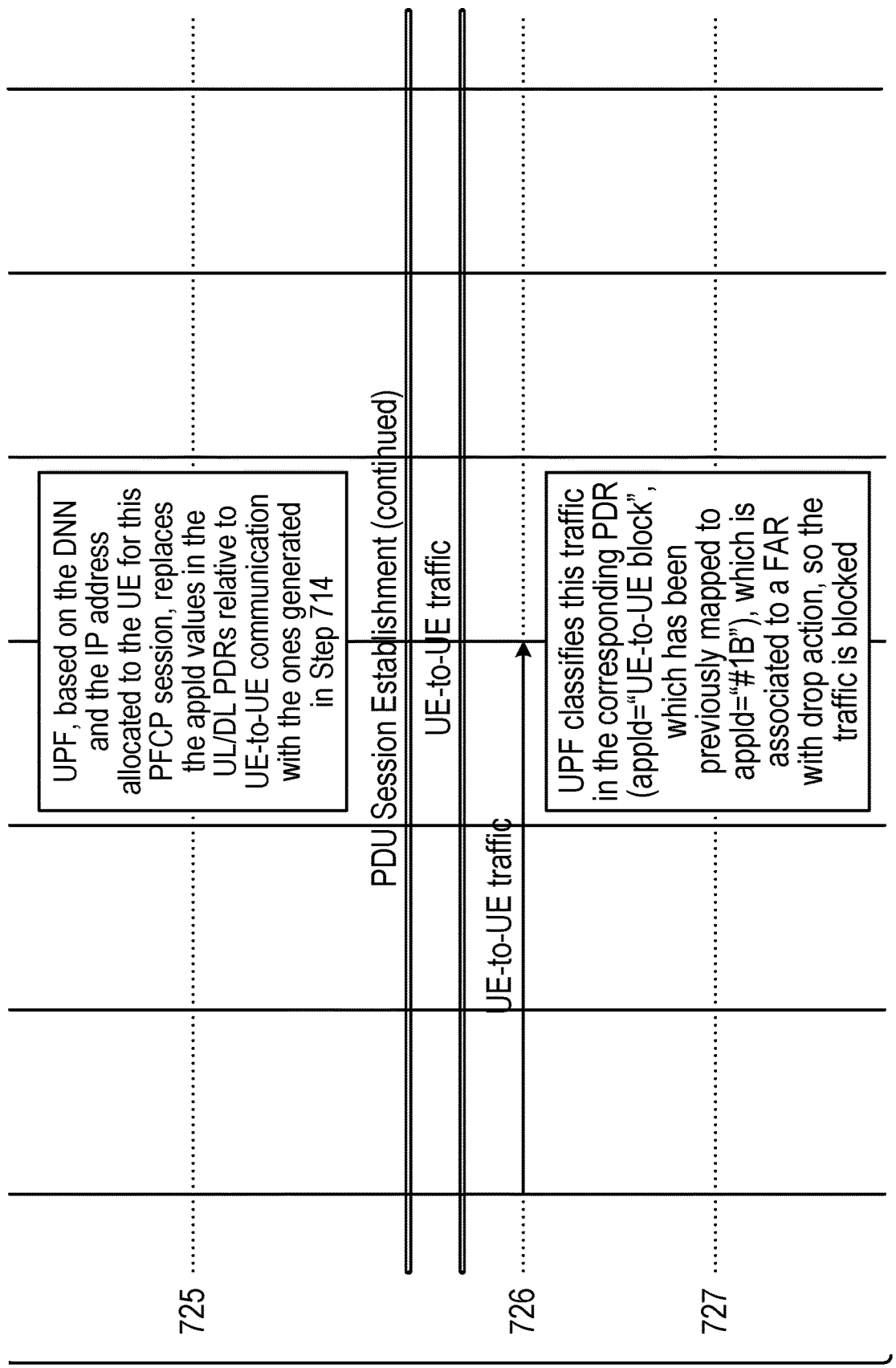

FIG. 6 illustrates a user data storage entity 600 comprising processing circuitry (or logic) 601. When implemented in a 5G network, the user data storage entity 600 can be a UDR. When implemented in a LTE (4G) network, the user data storage entity 600 can be a HSS.

It will be appreciated that the user data storage entity 600 may comprise one or more virtual machines running different software and/or processes. The user data storage entity 600 may therefore comprise one or more servers, switches and/or storage devices and/or may comprise cloud computing infrastructure that runs the software and/or processes.

The processing circuitry 601 controls the operation of the user data storage entity 600 and can implement the methods described herein in relation to a user data storage entity. The processing circuitry 601 can comprise one or more processors, processing units, multi-core processors or modules that are configured or programmed to control the user data storage entity 600 in the manner described herein. In particular implementations, the processing circuitry 601 can comprise a plurality of software and/or hardware modules that are each configured to perform, or are for performing, individual or multiple steps of the method described herein in relation to the user data storage entity 600.

In some embodiments, the user data storage entity 600 may optionally comprise a communications interface 602. The communications interface 602 can be for use in communicating with other nodes, such as other virtual nodes, and for example a policy control entity. The policy control entity can be a PCF in a 5G network and a PCRF in a 4G (LTE) network.

For example, the communications interface 602 can be configured to transmit to and/or receive from other nodes or network functions requests, resources, information, data, signals, or similar. The processing circuitry 601 may be configured to control the communications interface 602 to transmit to and/or receive from other nodes or network functions requests, resources, information, data, signals, or similar.

Optionally, the user data storage entity 600 may comprise a memory 603. In some embodiments, the memory 603 can be configured to store program code that can be executed by the processing circuitry 601 to perform the method described herein in relation to the user data storage entity 600. Alternatively or in addition, the memory 603 can be configured to store any requests, resources, information, data, signals, or similar that are described herein. The processing circuitry 601 may be configured to control the memory 603 to store any requests, resources, information, data, signals, or similar that are described herein.

FIG. 7 is a signalling diagram that shows the signalling according to an exemplary embodiment of the techniques described herein implemented in a 5G network. FIG. 7 shows a number of nodes: a first wireless device (UE #1) 701, an AMF 702, a session management entity in the form of an SMF 703, a user plane entity in the form of a UPF 704, a policy control entity in the form of a PCF 705, a user data storage entity in the form of a UDR 706, and a second wireless device (UE #2) 707. It is considered in examples below that UE #1 701 may want to communicate directly with UE #2 707. The signalling is divided into 3 general phases, an association procedure 708 (e.g. a PFCP Association procedure), a PFCP UE-to-UE procedure 709 and a PDU Session Establishment procedure 709.

Initially UE-to-UE communication policies are stored in a database, e.g. in UDR 706, and the SMF 703 can retrieve these policies, for example when the SMF 703 is initiated (booted up). Alternatively the UE-to-UE communication policies can be stored locally in the SMF 703.

The PFCP Association procedure 708 is between the SMF 703 and UPF 704, and the techniques described herein extend the existing PFCP mechanism to enable the UPF 704 to report to the SMF 703 that it supports UE-to-UE communication, a new capability in PFCP. This allows SMFs 703 to know which UPFs 704 support this capability, and thus it can influence UPF 704 selection.

Thus the UPF 704 sends an association request 711 to the SMF 703. The association request 711 indicates the capabilities of the UPF 704, and, if so capable, the association request 711 indicates that the UPF 704 supports UE-to-UE communication. The SMF 703 sends an association response 712 to the UPF 704.

Table 8.2.25-1 of 3GPP TS 29.244 Release 16 sets out various user plane (UP) function features that can be supported by a UPF. The capability to support UE-to-UE communication (denoted "UEUE") can be included in a modified version of Table 8.2.25-1, an extract of which is shown below:

TABLE 8.2.25-1

| Feature Octet/Bit | Feature | Interface | Description |
|---|---|---|---|
| . . . | . . . | . . . | . . . |
| 8/2 | RTTL | N4 | The UP function supports redundant transmission at transport layer. |
| 8/3 | VTIME | Sxb,N4 | UPF support of quota validity time feature. |
| 8/4 | NORP | Sxa, Sxb, Sxc, N4 | UP function support of Number of Reports as specified in clause 5.2.2.2. |
| 8/5 | IPTV | N4 | UPF support of IPTV service (see clause 5.25) |
| 8/6 | IP6PL | N4 | UPF supports UE IPv6 address(es) allocation with IPv6 prefix length other than default/64 (including allocating/128 individual IPV6 addresses), as specified in clause 4.6.2.2 of of 3GPP TS 23.316 [57]. |
| 8/7 | TSCU | N4 | Time Sensitive Communication is supported by the UPF (see clause 5.26). |
| 8/8 | MPTCP | N4 | UPF support of MPTCP Proxy functionality (see clause 5.20) |
| 9/1 | ATSSS-LL | N4 | UPF support of ATSSS-LLL steering functionality (see clause 5.20) |
| 9/2 | QFQM | N4 | UPF support of per QoS flow per UE QoS monitoring (see clause 5.24.4). |
| 9/3 | GPQM | N4 | UPF support of per GTP-U Path QoS monitoring (see clause 5.24.5). |
| 9/4 | UEUE | Sxb, Sxc, N4 | Control of UE-to-UE communication is supported by the UP function. |

Feature Octet/Bit: The octet and bit number within the Supported-Features IE, e.g. "5/1".
Feature: A short name that can be used to refer to the octet/bit and to the feature.
Interface: A list of applicable interfaces to the feature.
Description: A clear textual description of the feature.

In the PFCP UE-to-UE procedure 709, the SMF 703 forwards a UE-to-UE request 713 to the UPF 704. The request 713 includes UE-to-UE communication policies. The policies are included by extending PFCP, and provide for a new PFCP per node procedure relative to UE-to-UE communication.

The request 713 includes a first set of IP addresses available for allocation to UEs for which UE-to-UE communication is one of blocked or allowed (unblocked), and one or more subsets of the first set of IP addresses for which UE-to-UE communication is the other one of blocked or allowed.

Thus, the request 713 can include a list of IP address ranges, which is a pool of IP addresses that the network can allocate to UEs. For each of the listed IP address ranges, the request 713 can include an identifier for the address range, for example an identifier of a private/corporate DNN (e.g. DNN #X), or an identifier of a company (e.g. company M). The request 713 also indicates if the IP address range is blocked/unblocked for UE-to-UE communication.

For each of these IP address ranges, the request 713 can indicate a list of IP address sub-ranges for which the opposite indication applies (i.e. blocked/allowed (unblocked) for UE-to-UE communication. Additionally, the request 713 can indicate an identifier for each IP address sub-range, e.g. Department Z within Company M.

As shown in FIG. 7, an example of the content of request 713 is:

List of ((IP range #1, identifier=Company M, Blocked, list of (IP sub-range #1, Unblocked, identifier) . . . ); (IP range #2, identifier=Company N, Blocked, list of (IP sub-range #2, Unblocked, identifier) . . . )

The UPF 704 can store the UE-to-UE communication policies.

Figure 8:
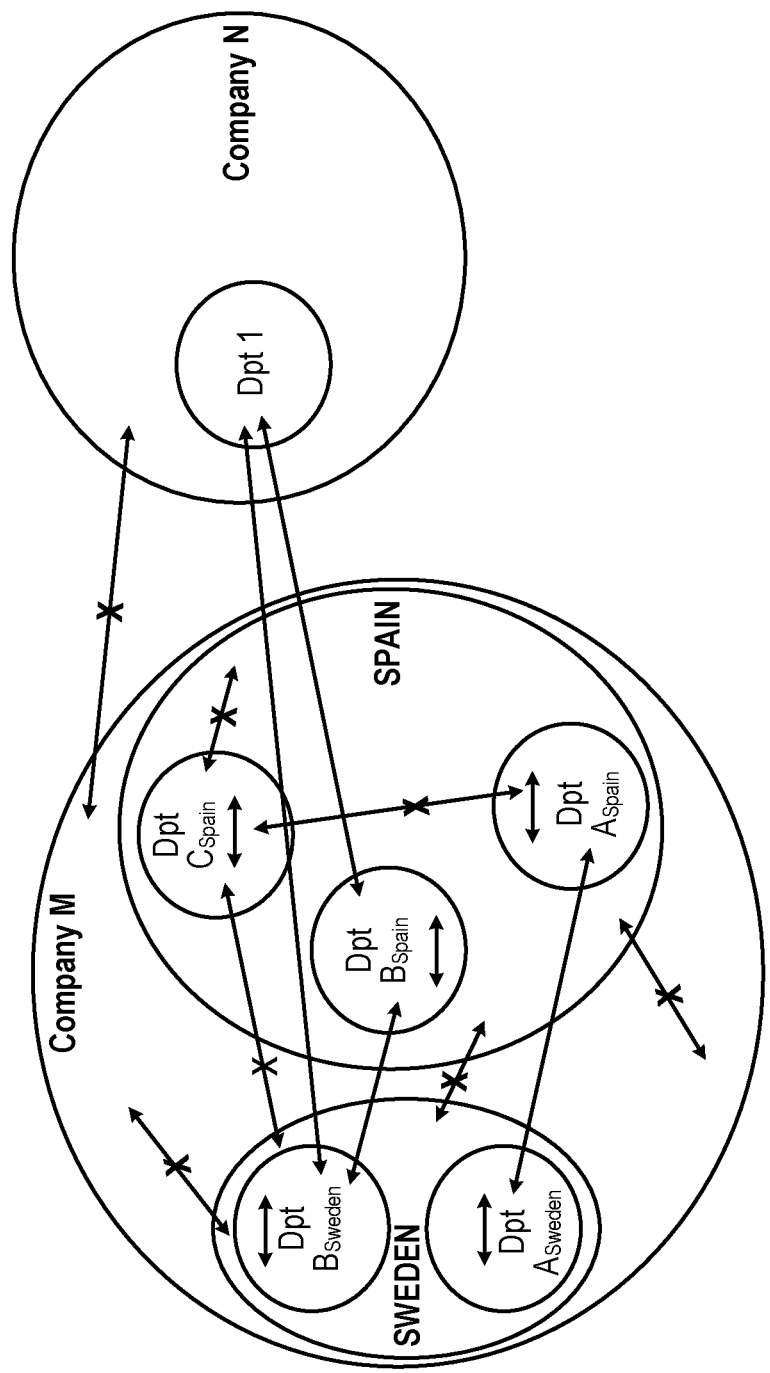
FIG. 8 is an illustration of two corporate DNNs to which embodiments of the techniques described herein can be applied.

Several examples of UE-to-UE communication policies that can be sent in request 713 are discussed below with reference to FIG. 8. FIG. 8 shows, under a certain network operator's network, a first company/DNN, 'Company M', and a second company/DNN, 'Company N'. Company M has offices in two geographic areas, Sweden and Spain, and personnel (and their UEs) are part of particular departments in Company M. In Sweden there is a first department, Dpt $A_{Sweden}$, and a second department, Dpt $B_{Sweden}$. In Spain there is a corresponding first department, Dpt $A_{Spain}$ (e.g. a similar type of department to Dpt $A_{Sweden}$), a corresponding second department, Dpt $B_{Spain}$, and a third department, Dpt $C_{Spain}$. In Company N, there is a first department, Dpt 1. In this example, Dpt 1 of Company Y may regularly have (or need to have) business interactions with Dpt $B_{Sweden}$ and Dpt $B_{Spain}$.

In the example of FIG. 8, arrows between companies/DNNs and between departments indicate that UE-to-UE communication is to be allowed, and arrows with a cross through them indicate that UE-to-UE communication is to be blocked.

Company M is allocated IP address range X for its private/corporate DNN where the communication between UEs under this IP range (i.e. communication between UEs in Company M) is blocked by default. That is, UEs in the private/corporate DNN of Company X are not permitted to performed UE-to-UE communication. The same behaviour (i.e. block UE-to-UE communication) applies to the communication between UEs in IP range X and UEs outside IP range X.

For the above IP range X (for Company M), a list of IP address sub-ranges is defined:

IP sub-range X1 for Company M Dpt $A_{Sweden}$, unblocked/allowed (which means that communication between UEs in IP range X1 is unblocked);

IP sub-range X2 for Company M Dpt $B_{Sweden}$, unblocked/allowed (which means that communication between UEs in IP range X2 is unblocked);

IP sub-range X3 for Company M Dpt $A_{Spain}$, unblocked (which means that communication between UEs in IP range X3 is unblocked);

IP sub-range X4 for Company M Dpt $C_{Spain}$, unblocked (which means that communication between UEs in IP range X4 is unblocked);

IP sub-range X5 for Company M Dpt $B_{Spain}$, unblocked (which means that communication between UEs in IP range X5 is unblocked); Company N is allocated IP address range Y for its private/corporate DNN where the communication between UEs under this IP range Y (i.e. communication between UEs in Company N) is blocked by default. The same behaviour (i.e. block UE-to-UE communication) applies to the communication between UEs in IP range Y and UEs outside IP range Y.

For the above IP range Y (for Company N), one IP address sub-range is defined:

IP sub-range Y1 for Company N Dpt 1, unblocked (which means that communication between UEs in IP range Y1 is unblocked);

Based on the above, the following policies for UE-to-UE communication can apply:

Policy 1: Company M Dpt $A_{Sweden}$ and Dpt $A_{Spain}$ are allowed to communicate with each other, i.e. UE-to-UE communications are unblocked, which is equivalent to state:

IP sub-range X1 and IP sub-range X3, unblocked.

Policy 2: Company M Dpt $B_{Sweden}$ and Dpt $B_{Spain}$ and Company N Dpt 1 are allowed to communicate with each other, i.e. UE-to-UE communications are unblocked, which is equivalent to state:

IP sub-range X2, IP sub-range X5 and IP sub-range Y1, unblocked.

The information sent from the SMF 703 to the UPF 704 in request 713 can be sent or updated at any time, for example to change a blocked/allowed status for a particular IP address range or sub-range, or to add or remove a new IP address sub-range. In that case, the SMF 703 can send an update request message to the UPF 704 with the updated information.

In step 714 the UPF 704 generates a set of application identifiers, appId, for each IP sub-range. The appIds can be generated or defined on a reserved name space. The set of appIds includes two appIds for each IP sub-range, one to allow UE-to-UE communication, and the other to block UE-to-UE communication.

The UPF 704 sends a PFCP response 715 to the SMF 703, e.g. a PFCP UE-to-UE response 715.

Where an updated request message is sent to the UPF 704, the UPF 704 updates the internally generated set of appIds accordingly.

Continuing the example based on FIG. 8, the following appIds could be generated.

appId #1A (to allow UE-to-UE communication when the UE pertains to Company M Dpt $A_{Sweden}$)

Traffic detection rules: Server IP address matches IP sub-range X3 or IP sub-range X1;

Associated Forwarding rules: Allow the (UE-to-UE) traffic to pass.

appId #1B (to block UE-to-UE communication when the UE pertains to Company M Dpt $A_{Sweden}$)

Traffic detection rules: IP range X or IP range Y;

Associated Forwarding rules: Block traffic.

Here it should be noted that the traffic classification rules for appId #1B assume that the traffic classification rules for appId #1A are applied with higher precedence. This is discussed further below, and also applies to the appIds described below.

appId #2A (to allow UE-to-UE communication when the UE pertains to Company M Dpt $B_{Sweden}$)
  Traffic detection rules: Server IP address matches IP sub-range X2 or IP sub-range X5 or IP sub-range Y1;
  Associated Forwarding rules: Allow the traffic to pass.
appId #2B (to block UE-to-UE communication when the UE pertains to Company M Dpt $B_{Sweden}$)
  Traffic detection rules: IP range X or IP range Y
  Associated Forwarding rules: Block traffic
appId #3A (to allow UE-to-UE communication when the UE pertains to Company M Dpt $A_{Spain}$):
  Traffic detection rules: Server IP address matches IP sub-range X3 or IP sub-range X1;
  Associated Forwarding rules: Allow the traffic to pass
appId #3B (to block UE-to-UE communication when the UE pertains to Company M Dpt $A_{Spain}$):
  Traffic detection rules: IP range X or IP range Y
  Associated Forwarding rules: Block traffic
appId #4A (to allow UE-to-UE communication when the UE pertains to Company M Dpt $C_{Spain}$):
  Traffic detection rules: Server IP address matches IP sub-range X4
  Associated Forwarding rules: Allow the traffic to pass
appId #4B (to block UE-to-UE communication when the UE pertains to Company M Dpt $C_{Spain}$):
  Traffic detection rules: IP range X or IP range Y
  Associated Forwarding rules: Block traffic
appId #5A (to allow UE-to-UE communication when the UE pertains to Company M Dpt $B_{Spain}$):
  Traffic detection rules: Server IP address matches IP sub-range X2 or IP sub-range X5 or IP sub-range Y1
  Associated Forwarding rules: Allow the traffic to pass
appId #5B (to block UE-to-UE communication when the UE pertains to Company M Dpt $B_{Spain}$):
  Traffic detection rules: IP range X or IP range Y
  Associated Forwarding rules: Block traffic
appId #6A (to allow UE-to-UE communication when the UE pertains to Company N Dpt 1):
  Traffic detection rules: Server IP address matches IP sub-range X2 or IP sub-range X5 or IP sub-range Y1
  Associated Forwarding rules: Allow the traffic to pass
appId #6B (to block UE-to-UE communication when the UE pertains to Company N Dpt 1):
  Traffic detection rules: IP range X or IP range Y
  Associated Forwarding rules: Block traffic In the PDU Session Establishment procedure 709, the first wireless device 701, UE #1, triggers PDU session establishment for a certain DNN (e.g. Company M corporate DNN), by sending a PDU Session Establishment Request 716 to the AMF 702. The PDU Session Establishment Request 716 can indicate the DNN to which the request relates. It should be noted that FIG. 7 does not include all of the signalling messages involved in a typical PDU Session Establishment procedure, and only the messages relevant for explaining the techniques presented herein are shown in FIG. 7 and described below.

The AMF 702 selects an SMF 703 to manage the PDU session (the SMF selection function in the AMF 702 selects an SMF instance based on the available SMF instances obtained from a NRF or on the configured SMF information in the AMF 702). The AMF 702 then sends a session create message 717 to the SMF 703. The session create message 717 can indicate the DNN to which the message relates (e.g. Company M). The session create message 717 can be a Nsmf PDU Session Create message.

The SMF 703 sends a policy request 718 to the PCF 705 to retrieve policies for the user PDU session. The policy request 718 can be a Npcf_SMPolicyControl_Create Request message.

The PCF 705 sends a query request 719 to the UDR 706 to retrieve the policy data for this subscriber's PDU session. The query request 719 can include an identifier of the subscriber (i.e. UE #1). The query request 719 can be a Nudr_Query Request message.

The UDR 706 responds to the query request 719 with a query response 720 indicating a subscriber type for the subscriber (e.g. for UE #1). The query response 720 can be a Nudr_Query Response message that includes subscriber policy data, including the subscriber type. In the example of FIG. 8, the subscriber type can indicate a department that the subscriber is associated with (e.g. Dpt $A_{Sweden}$).

The PCF 705 generates PCC rules based on subscriber policy data and sends a policy response 721 to the SMF 703. The policy response 721 indicates the subscriber type and the PCC rules. The policy response 721 can be a Npcf Policy Response.

In step 722, the SMF 703 allocates an IP address to the UE 701 from an appropriate IP sub-range and generates two uplink (UL)/DL PDRs (of type appId) relative to UE-to-UE communication with the highest precedence for that PDU session. The SMF 703 allocates an IP address based both on the DNN indicated in the session create message 717 and on the subscriber type indicated in the policy response 721. For example for a subscriber type indicating that the subscriber is associated with Dpt $A_{Sweden}$ can be allocated a (currently unused) IP address in the IP sub-range X3.

In step 722 the SMF 703 can generate two UL/DL PDRs as follows:
  UL/DL PDR with PDI of type appId, where appId="UE-to-UE allow". This PDR is associated to a FAR, URR and/or QER in order to apply the corresponding enforcement actions, e.g. a FAR indicating allow action and a URR for reporting purposes. It should be noted that the above PDR is internal to the SMF 703 and is not based on any existing PCC rule from the PCF 705 (i.e. it is transparent to the PCF 705).
  UL/DL PDR with PDI of type appId, where appId="UE-to-UE block". This PDR is associated to a FAR, URR and/or QER in order to apply the corresponding enforcement actions, e.g. a FAR indicating block (or redirect) action and a URR for reporting purposes. It should be noted that the above PDR is internal to the SMF 703 and is not based on any existing PCC rule from the PCF 705 (i.e. it is transparent to the PCF 705).

The SMF 703 sends a session establishment request 723 to the UPF 704. The session establishment request 723 can be a PFCP Session Establishment Request. The session establishment request 723 requests the UPF 704 to provision the PDRs and the corresponding enforcement actions: FARs, URRs, etc for the PDU session. Specifically, the SMF 703 will provision the two UL/DL PDRs described above relative to UE-to-UE communication. The session establishment request can include information such as any of the DNN, the IP address of the UE 701, the PDRs, FARs, GERs and/or URRs based on the PCC rules, and an UL/DL PDR (appId='UE-to-UE allow') associated to a FAR (allow) and a UL/DL PDR (appId='UE-to-UE block') associated to a FAR (drop)).

The UPF 704 responds to the SMF 703 with a session establishment response 724. The session establishment response 724 may be a PDU Session Establishment Response.

In step 725, the UPF 704 replaces the appId values in the UL/DL PDRs relative to UE-to-UE communication that are allocated to the UE 701 for this session with the appIds generated in step 714 above. The appId values to use are based on the DNN and the IP address allocated to the UE for this session.

Continuing the above example, as the subscriber (UE 701) pertains to the Company M Dpt $A_{Spain}$, where the SMF 703 allocated an IP address within IP sub-range X3, the UPF 704 replaces the appIds as follows:

From appId="UE-to-UE allow" to appId="#3A"
From appId="UE-to-UE block" to appId="#3B"

After the PDU session is established, the UE 701 starts UE-to-UE communication, for example by sending a message/data traffic 726 (e.g. a TCP SYN message) to the UPF 704 where the destination IP address in the IP header corresponds to another UE's IP address (e.g. UE #2).

In step 727 the UPF 704 classifies data traffic according to the corresponding PDR. For any incoming traffic, the UPF 704 runs PDR evaluation by first trying to match with the two UL/DL PDRs relative to UE-to-UE communication (as they have higher precedence).

Continuing the above example, where the subscriber (UE) pertains to Company M Dpt $A_{Spain}$:

If the subscriber tries to communicate directly with a UE in Company M Dpt $A_{Sweden}$, the traffic will match the PDR for appId="#3A", so this traffic will be allowed.
If the subscriber tries to communicate directly with a UE in Company M Dpt $B_{Sweden}$, the traffic will match the PDR for appId="#3B", so this traffic will be blocked.

Thus, the technique set out above with respect to FIG. 7 enables UE-to-UE communication to be efficiently controlled on a per DNN basis and/or on a per IP range basis.

As noted above, the techniques shown in FIG. 7 can be implemented in a 4G network. In this case, the operations of the SMF 703 are performed by a PGW-C or TDF-C, the operations of the UPF 704 are performed by a PGW-U or a TDF-U, the operations of the PCF 705 are performed by a PCRF and the operations of the UDR 706 are performed by a HSS.

Figure 9:
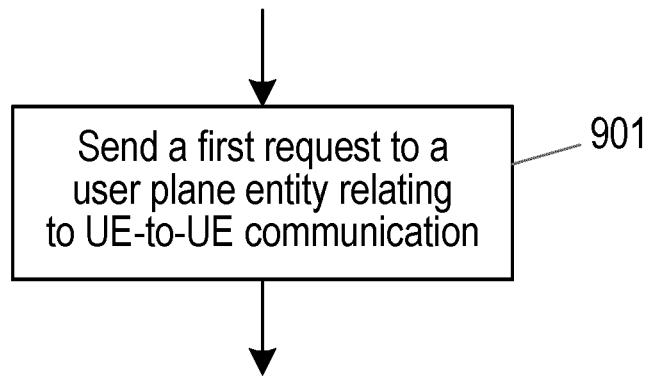
FIG. 9 is a flow chart illustrating a method of operating a session management entity according to various embodiments.

The flow chart in FIG. 9 illustrates a method of operating a session management entity in a communication network according to various embodiments. The session management entity can be an SMF, a PGW-C or a TDF-C.

In step 901 the method comprises the session management entity sending a first request to a user plane entity in the communication network. The first request relates to UE-to-UE communication and indicates a first set of IP addresses available for allocation to UEs for which UE-to-UE communication is one of blocked or allowed, and at least one subset of the first set of IP addresses for which UE-to-UE communication is the other one of blocked or allowed. The first request may be a PFCP request. The first request may correspond to request 713 in FIG. 7.

In some embodiments, the first request further comprises one or both of an indication of whether UE-to-UE communication is blocked or allowed for a UE having an IP address in the first set of IP addresses, and an indication of whether UE-to-UE communication is the other one of blocked or allowed for a UE having an IP address in the at least one subset of the first set of IP addresses.

In some embodiments, the first request further comprises one or both of a first identifier associated with the first set of IP addresses; and a respective second identifier associated with respective ones of the at least one subset of the first set of IP addresses.

In some embodiments, the method further comprises the step of receiving a first response to the first request from the user plane entity. The first response may correspond to response 715 in FIG. 7.

In some embodiments, the method can further comprise receiving an association request from the user plane entity. The association request comprises an indication of the capability of the user plane entity to support UE-to-UE communication. The association request may correspond to association request 711 in FIG. 7.

The method may further comprise the session management entity sending an association response to the user plane entity in response to the received association request. The association response may correspond to association response 712 in FIG. 7.

In some embodiments, if a UE-to-UE communication data session is to be established by a first wireless device, the session management entity can receive a policy response from a policy control entity in the communication network. The policy response indicates a subscriber type for the first wireless device. The policy response may correspond to policy response 721 in FIG. 7. In some embodiments, prior to receiving a policy response, the session management entity can send a policy request to the policy control entity to request the indication of the subscriber type for the first wireless device. The policy request may correspond to policy create request 718 in FIG. 7.

In some embodiments, the method further comprises allocating an IP address to the first wireless device according to the subscriber type. This may correspond to step 722 in FIG. 7. The session management entity may then generate a first packet rule for the UE-to-UE communication data session. The first packet rule is for an appId type corresponding to UE-to-UE communication being one of blocked or allowed. The session management entity also generates a second packet rule for the UE-to-UE communication data session. The second packet rule is for an appId type corresponding to UE-to-UE communication being the other one of blocked or allowed. This generation of the packet rules may correspond to step 722 of FIG. 7.

In some embodiments, the first packet rule is associated to one or more of a FAR, a URR, and a QER for the one of the UE-to-UE communication being blocked or allowed, and the second packet rule is associated to one or more of a FAR, URR and QER for the one of the UE-to-UE communication being the other one of blocked or allowed.

In some embodiments, the method further comprises sending a session establishment request to the user plane entity to provision the packet rules for the UE-to-UE communication data session. The session establishment request may correspond to request 723 in FIG. 7. The method may further comprise receiving a session establishment response from the user plane entity. The session establishment response may correspond to session establishment response 724 in FIG. 7.

Figure 10:
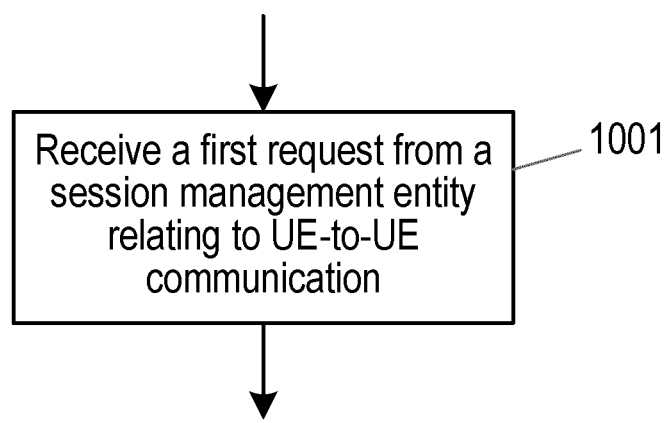
FIG. 10 is a flow chart illustrating a method of operating a user plane entity according to various embodiments.

The flow chart in FIG. 10 illustrates a method of operating a user plane entity in a communication network according to various embodiments. The user plane entity can be a UPF, a PGW-U or a TDF-U.

In step 1001 the method comprises receiving a first request from a session management entity in the communication network. The first request relates to UE-to-UE communication and indicates a first set of IP addresses available for allocation to UEs for which UE-to-UE communication is one of blocked or allowed, and at least one subset of the first set of IP addresses for which UE-to-UE communication is the other one of blocked or allowed. The first request may be a PFCP request. The first request may correspond to request 713 in FIG. 7.

In some embodiments, the first request further comprises one or both of an indication of whether UE-to-UE communication is blocked or allowed for a UE having an IP address in the first set of IP addresses, and an indication of whether UE-to-UE communication is the other one of blocked or allowed for a UE having an IP address in the at least one subset of the first set of IP addresses.

In some embodiments, the first request further comprises one or both of a first identifier associated with the first set of IP addresses; and a respective second identifier associated with respective ones of the at least one subset of the first set of IP addresses.

In some embodiments, the method further comprises generating a pair of appIds for each subset of the first set of IP addresses. A first appId of a pair is for allowing UE-to-UE communication and a second appId of a pair is for blocking UE-to-UE communication. The step of generating may correspond to step 714 in FIG. 7.

In some embodiments, the method further comprises sending a first response to the first request to the session management entity. The first response may correspond to response 715 in FIG. 7.

In some embodiments, the method further comprises sending an association request to the session management entity. The association request comprises an indication of the capability of the user plane entity to support UE-to-UE communication. The association request may correspond to association request 711 in FIG. 7.

In some embodiments, the method further comprises receiving an association response from the session management entity in response to the association request. The association response may correspond to association response 712 in FIG. 7.

In some embodiments, the method further comprises receiving a session establishment request from the session management entity to provision packet rules for a UE-to-UE communication data session for a first wireless device. The packet rules may comprise a first packet rule for the UE-to-UE communication data session and a second packet rule for the UE-to-UE communication data session. The first packet rule is for an appId type corresponding to UE-to-UE communication being one of blocked or allowed and the second packet rule is for an appId type corresponding to UE-to-UE communication being the other one of blocked or allowed. The session establishment request may correspond to session establishment request 723 in FIG. 7. The session establishment request may also comprise an IP address for the first wireless device.

In some embodiments, the first packet rule is associated to one or more of a FAR, a URR, and a QER for the one of the UE-to-UE communication being blocked or allowed, and the second packet rule is associated to one or more of a FAR, URR and QER for the one of the UE-to-UE communication being the other one of blocked or allowed.

In some embodiments, the method further comprises sending a session establishment response to the session management entity. The session establishment response may correspond to session establishment response 724 in FIG. 7.

In some embodiments, the method further comprises replacing the appIds for the received packet rules for the UE-to-UE communication data session with the first appId and the second appId. This step can correspond to step 725 in FIG. 7.

In some embodiments, the method further comprises receiving data traffic from the first wireless device in the UE-to-UE communication data session. This can correspond to UE-to-UE traffic 726 in FIG. 7.

In some embodiments, the method further comprises classifying the received data traffic according to a corresponding received packet rule, and allowing or blocking the received data traffic according to the received packet rule. This step can correspond to step 727 in FIG. 7.

Figure 11:
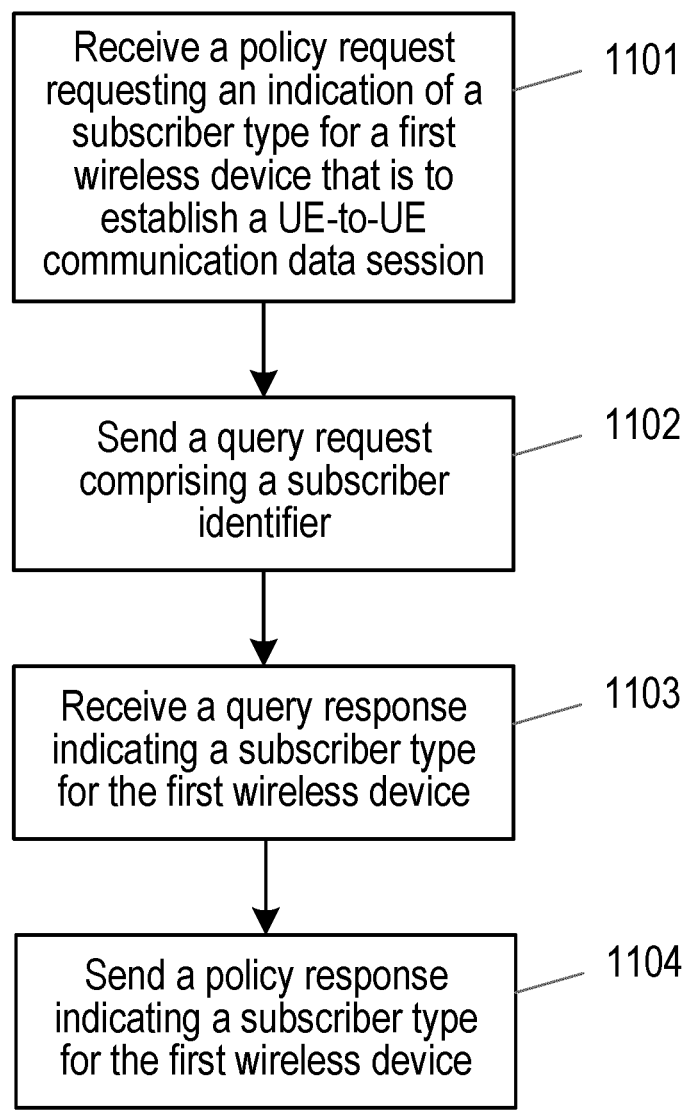
FIG. 11 is a flow chart illustrating a method of operating a policy control entity according to various embodiments.

The flow chart in FIG. 11 illustrates a method of operating a policy control entity in a communication network according to various embodiments. The policy control entity can be a PCF 705 or a PCRF.

In step 1101, the policy control entity receives a policy request from a session management entity requesting an indication of a subscriber type for a first wireless device that is to establish a UE-to-UE communication data session. The policy request may correspond to policy create request 718 in FIG. 7.

In step 1102 the policy control entity sends a query request to a user data storage entity in the communication network. The query request comprises a subscriber identifier. The query request may correspond to query request 719 in FIG. 7.

In step 1103 the policy control entity receives a query response from the user data storage entity indicating a subscriber type for the first wireless device. The query response may correspond to query response 720 in FIG. 7.

In step 1104, the policy control entity sends a policy response to the session management entity. The policy response indicates a subscriber type for the first wireless device. The policy response may correspond to policy response 721 in FIG. 7.

Figure 12:
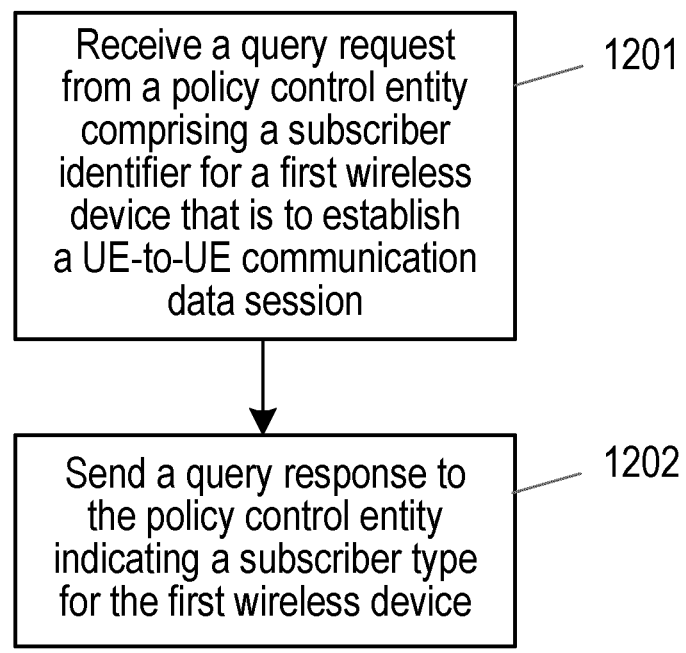
FIG. 12 is a flow chart illustrating a method of operating a user data storage entity according to various embodiments.

The flow chart in FIG. 12 illustrates a method of operating a user data storage entity in a communication network according to various embodiments. The user data storage entity can be a UDR 706 or a HSS.

In step 1201, the method comprises receiving a query request from a policy control entity in the communication network. The query request comprises a subscriber identifier for a first wireless device that is to establish a UE-to-UE communication data session. The query request may correspond to query request 719 in FIG. 7.

In step 1202 the user data storage entity sends a query response to the policy control entity indicating a subscriber type for the first wireless device. The query response may correspond to query response 720 in FIG. 7.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method of operating a session management entity in a communication network, the method comprising:

sending a first request to a user plane entity in the communication network, wherein the first request relates to User Equipment (UE)-to-UE communication and indicates:
a first set of Internet Protocol (IP) addresses available for allocation to UEs for which UE-to-UE communication is one of blocked or allowed; and
at least one subset of the first set of IP addresses for which UE-to-UE communication is the other one of blocked or allowed.

2. The method of claim 1, wherein the first request further comprises one or both of:
an indication of whether UE-to-UE communication is blocked or allowed for a UE having an IP address in the first set of IP addresses; and
an indication of whether UE-to-UE communication is the other one of blocked or allowed for a UE having an IP address in the at least one subset of the first set of IP addresses.

3. The method of claim 1, wherein the first request further comprises one or both of:
a first identifier associated with the first set of IP addresses; and
a respective second identifier associated with respective ones of the at least one subset of the first set of IP addresses.

4. The method of claim 1, further comprising:
receiving an association request from the user plane entity, wherein the association request comprises an indication of the capability of the user plane entity to support UE-to-UE communication; and
sending an association response to the user plane entity in response to the received association request.

5. The method of claim 1, further comprising, when a UE-to-UE communication data session is to be established by a first wireless device:
sending a policy request to the policy control entity to request an indication of a subscriber type for the first wireless device; and
receiving a policy response from a policy control entity in the communication network, wherein the policy response indicates a subscriber type for the first wireless device.

6. The method of claim 5, further comprising:
allocating an IP address to the first wireless device according to the subscriber type;
generating a first packet rule for the UE-to-UE communication data session, wherein the first packet rule is for an application identifier (appId) type corresponding to UE-to-UE communication being one of blocked or allowed; and
generating a second packet rule for the UE-to-UE communication data session, wherein the second packet rule is for an appId type corresponding to UE-to-UE communication being the other one of blocked or allowed.

7. The method of claim 6, wherein:
the first packet rule is associated to one or more of a forwarding action rule (FAR), a usage reporting rule (URR), and a quality of service (QoS) enforcement rule (QER) for the one of the UE-to-UE communication being blocked or allowed; and
the second packet rule is associated to one or more of a FAR, URR, and QER for the one of the UE-to-UE communication being the other one of blocked or allowed.

8. The method of claim 6, further comprising:
sending a session establishment request to the user plane entity to provision the packet rules for the UE-to-UE communication data session; and
receiving a session establishment response from the user plane entity.

9. The method of claim 1, wherein the first request is part of a Packet Flow Control Protocol (PFCP).

10. The method of claim 1, wherein the session management entity is comprised in a Session Management Function (SMF), a Packet Data Network (PDN) Gateway, or a Traffic Detection Function Control Plane Function (TDF-C).

11. A session management entity comprising:
processing circuitry and memory circuitry, the memory circuitry storing instructions executable by the processing circuitry whereby the session management entity is configured to send a first request to a user plane entity in a communication network, wherein the first request relates to User Equipment (UE)-to-UE communication and indicates:
a first set of Internet Protocol (IP) addresses available for allocation to UEs for which UE-to-UE communication is one of blocked or allowed; and
at least one subset of the first set of IP addresses for which UE-to-UE communication is the other one of blocked or allowed.

12. The session management entity of claim 11, wherein the first request further comprises one or both of:
an indication of whether UE-to-UE communication is blocked or allowed for a UE having an IP address in the first set of IP addresses; and
an indication of whether UE-to-UE communication is the other one of blocked or allowed for a UE having an IP address in the at least one subset of the first set of IP addresses.

13. The session management entity of claim 11, wherein the first request further comprises one or both of:
a first identifier associated with the first set of IP addresses; and
a respective second identifier associated with respective ones of the at least one subset of the first set of IP addresses.

14. The session management entity of claim 11, wherein the session management entity is further configured to:
receive an association request from the user plane entity, wherein the association request comprises an indication of the capability of the user plane entity to support UE-to-UE communication; and
send an association response to the user plane entity in response to the received association request.

15. The session management entity of claim 11, wherein the session management entity is further configured to, when a UE-to-UE communication data session is to be established by a first wireless device:
send a policy request to the policy control entity to request an indication of a subscriber type for the first wireless device; and
receive a policy response from a policy control entity in the communication network, wherein the policy response indicates a subscriber type for the first wireless device.

16. The session management entity of claim 15, wherein the session management entity is further configured to:
allocate an IP address to the first wireless device according to the subscriber type;
generate a first packet rule for the UE-to-UE communication data session, wherein the first packet rule is for an application identifier (appId) type corresponding to UE-to-UE communication being one of blocked or allowed; and generate a second packet rule for the UE-to-UE communication data session, wherein the second packet rule is for an appId type corresponding to UE-to-UE communication being the other one of blocked or allowed.

17. The session management entity of claim 16, wherein:
the first packet rule is associated to one or more of a forwarding action rule (FAR), a usage reporting rule (URR), and a quality of service (QoS) enforcement rule (QER) for the one of the UE-to-UE communication being blocked or allowed; and the second packet rule is associated to one or more of a FAR, URR, and QER for the one of the UE-to-UE communication being the other one of blocked or allowed.

18. The session management entity of claim 16, wherein the session management entity is further configured to:
send a session establishment request to the user plane entity to provision the packet rules for the UE-to-UE communication data session; and receive a session establishment response from the user plane entity.

19. The session management entity of claim 11, wherein the first request is part of a Packet Flow Control Protocol (PFCP).

20. A non-transitory computer readable medium storing a computer program for controlling a session management entity in a cellular communication network, the computer program comprising software instructions that, when run on processing circuitry of the session management entity, cause the session management entity to:
send a first request to a user plane entity in a communication network, wherein the first request relates to User Equipment (UE)-to-UE communication and indicates:
a first set of Internet Protocol (IP) addresses available for allocation to UEs for which UE-to-UE communication is one of blocked or allowed; and
at least one subset of the first set of IP addresses for which UE-to-UE communication is the other one of blocked or allowed.

* * * * *